US009019934B2

(12) United States Patent  (10) Patent No.: US 9,019,934 B2
Yun et al.  (45) Date of Patent: Apr. 28, 2015

(54) SYSTEMS AND NETWORKS FOR HALF AND FULL DUPLEX WIRELESS COMMUNICATION USING MULTIPLE RADIOS

(75) Inventors: Louis Yun, Los Altos, CA (US); Ali Niknejad, Berkeley, CA (US); Venkateswara Sattiraju, Union City, CA (US); Surendar Magar, Dublin, CA (US)

(73) Assignee: Hmicro, Inc., Fremont, CA (US)

( * ) Notice: Subject to any disclaimer, the term of this patent is extended or adjusted under 35 U.S.C. 154(b) by 134 days.

(21) Appl. No.: 12/739,565

(22) PCT Filed: Oct. 24, 2008

(86) PCT No.: PCT/US2008/081179
§ 371 (c)(1),
(2), (4) Date: Sep. 27, 2010

(87) PCT Pub. No.: WO2009/055714
PCT Pub. Date: Apr. 30, 2009

(65) Prior Publication Data
US 2011/0019561 A1    Jan. 27, 2011

Related U.S. Application Data

(60) Provisional application No. 60/982,242, filed on Oct. 24, 2007.

(51) Int. Cl.
*H04W 4/00* (2009.01)
*H04W 88/06* (2009.01)
(Continued)

(52) U.S. Cl.
CPC ............ *H04W 88/06* (2013.01); *H04W 72/085* (2013.01)

(58) Field of Classification Search
CPC .............. H04W 72/12; H04W 72/085; H04W 28/0231; H04W 36/14; H04W 36/16; H04W 36/18; H04W 36/20; H04W 36/24; H04W 88/06; H04W 52/50; H04L 67/125; H04N 21/42201; H04N 21/43637
USPC ......... 370/252, 276–282, 216–229, 331–333, 370/465–469
See application file for complete search history.

(56) References Cited

U.S. PATENT DOCUMENTS 4,124,817 A  11/1978  Takahashi
4,412,340 A  10/1983  Bartlett et al.
(Continued)

FOREIGN PATENT DOCUMENTS

EP  0716554 A2  6/1996
EP  0716554 A3  8/1999
(Continued)

OTHER PUBLICATIONS

Aoki, et al. Fully Integrated CMOS Power Amplifier Design Using the Distributed Active-Transformer Architecture. IEEE Journal of Solid-State Circuits, Mar. 2002; 37(3):371-383.
(Continued)

*Primary Examiner* — Xavier Szewai Wong
(74) *Attorney, Agent, or Firm* — Wilson Sonsini Goodrich & Rosati

(57) ABSTRACT

Provided herein is a wireless communication system comprising a first device and a second device. The first device comprises a first radio type and a second radio type. The second device comprises a first radio type and a second radio type. The first device is adaptable to form a communication link with the second device using the first radio or the second radio. The first device can be adaptable to transmit data to the second device through the first radio type or the second radio type. The second device can be adaptable to form a communication link with the first device through dynamic switching between the first radio type and second radio type of the second device. The second device can be adaptable to receive data from the first device through the first radio type or the second radio type. The second device can be adaptable to transmit data to the first device using the first radio type or the second radio type. The second device can be adaptable to be in communication with the first device through dynamic switching between the first radio type and the second radio type and the second device can be adaptable to transmit data to the first device through the first radio type or the second radio type. Further provided herein is a wireless communication network comprising a plurality of devices comprising at least two devices, wherein at least two devices of the plurality of device are adaptable to form a communication link using a radio type selected from a plurality of radio types, wherein the network is adaptable to dynamically select the radio type used to form the communication link. The network can monitor the quality of the communication link between the at least two devices and is further adaptable to dynamically switch between the plurality of radio types in response to the quality of the communication link.

32 Claims, 1 Drawing Sheet

(51) Int. Cl.
H04J 3/16 (2006.01)
H04J 3/22 (2006.01)
H04W 72/08 (2009.01)

(56) References Cited

U.S. PATENT DOCUMENTS

| | | | |
|---|---|---|---|
| 5,325,204 A | 6/1994 | Scarpa | |
| 5,668,837 A | 9/1997 | Dent | |
| 5,852,630 A | 12/1998 | Langberg et al. | |
| 6,016,316 A * | 1/2000 | Moura et al. | 370/389 |
| 6,091,715 A | 7/2000 | Vucetic et al. | |
| 6,185,201 B1 | 2/2001 | Kiyamagi et al. | |
| 6,192,239 B1 | 2/2001 | Lee et al. | |
| 6,351,652 B1 | 2/2002 | Finn et al. | |
| 6,407,837 B1 | 6/2002 | Spickermann | |
| 6,498,927 B2 | 12/2002 | Kang et al. | |
| 6,625,433 B1 | 9/2003 | Poirier et al. | |
| 6,694,150 B1 | 2/2004 | Standke et al. | |
| 6,725,058 B2 | 4/2004 | Rinne et al. | |
| 6,728,517 B2 | 4/2004 | Sugar et al. | |
| 6,741,847 B1 | 5/2004 | Claxton et al. | |
| 6,853,835 B2 | 2/2005 | Wynbeek | |
| 6,952,594 B2 | 10/2005 | Hendin | |
| 7,024,169 B2 | 4/2006 | Ciccarelli et al. | |
| 7,068,987 B2 | 6/2006 | Baldwin et al. | |
| 7,089,033 B2 | 8/2006 | Leinonen et al. | |
| 7,136,009 B1 | 11/2006 | Tsui et al. | |
| 7,171,161 B2 | 1/2007 | Miller | |
| 7,174,138 B2 | 2/2007 | Webster et al. | |
| 7,174,190 B2 | 2/2007 | Walker et al. | |
| 7,194,244 B2 | 3/2007 | Akamine et al. | |
| 7,254,191 B2 | 8/2007 | Sugar et al. | |
| 7,266,361 B2 | 9/2007 | Burdett | |
| 7,269,151 B2 | 9/2007 | Diener et al. | |
| 7,305,052 B2 | 12/2007 | Spiridon et al. | |
| 7,313,374 B2 | 12/2007 | Lewis et al. | |
| 7,315,564 B2 | 1/2008 | McCorkle | |
| 7,340,010 B2 | 3/2008 | Kroeger | |
| 7,349,503 B2 | 3/2008 | Husted et al. | |
| 7,349,709 B2 | 3/2008 | Hanusch et al. | |
| 7,397,872 B2 | 7/2008 | Komori et al. | |
| 7,440,491 B2 | 10/2008 | Balakrishnan et al. | |
| 7,444,127 B2 | 10/2008 | Laroia et al. | |
| 7,512,395 B2 | 3/2009 | Beukema et al. | |
| 7,522,885 B2 | 4/2009 | Parssinen et al. | |
| 7,526,052 B2 | 4/2009 | Davidoff et al. | |
| 7,643,811 B2 | 1/2010 | Reunamaki et al. | |
| 7,652,979 B2 | 1/2010 | Arslan et al. | |
| 7,653,369 B2 | 1/2010 | Simmons et al. | |
| 7,680,201 B2 | 3/2010 | Kroeger | |
| 7,702,046 B2 | 4/2010 | Murthy et al. | |
| 7,706,468 B2 | 4/2010 | Kroeger | |
| 7,711,368 B2 | 5/2010 | Feher | |
| 7,747,338 B2 | 6/2010 | Korhonen | |
| 7,840,199 B2 | 11/2010 | Krishnaswamy et al. | |
| 7,873,120 B2 | 1/2011 | Kroeger | |
| 7,957,495 B2 | 6/2011 | Wu et al. | |
| 7,962,148 B2 | 6/2011 | Stamoulis et al. | |
| 7,979,049 B2 | 7/2011 | Oredsson et al. | |
| 7,986,652 B1 * | 7/2011 | Hui et al. | 370/311 |
| 7,986,739 B2 | 7/2011 | Aytur et al. | |
| 8,036,159 B2 | 10/2011 | Berens | |
| 8,126,030 B2 | 2/2012 | Klomsdorf et al. | |
| 8,134,949 B2 | 3/2012 | Ruuska et al. | |
| 8,149,894 B2 | 4/2012 | Fudge | |
| 8,249,616 B2 | 8/2012 | Boejer et al. | |
| 8,254,986 B2 * | 8/2012 | Russell | 455/552.1 |
| 8,315,238 B2 | 11/2012 | Taleb et al. | |
| 8,331,425 B2 | 12/2012 | Nicolas et al. | |
| 8,331,898 B2 | 12/2012 | Waters et al. | |
| 8,345,808 B2 | 1/2013 | Ye et al. | |
| 8,369,467 B2 | 2/2013 | Kajakine et al. | |
| 8,379,549 B2 | 2/2013 | Oppelt et al. | |
| 8,463,189 B2 | 6/2013 | Bashir et al. | |
| 8,472,868 B2 | 6/2013 | Mu et al. | |
| 8,631,483 B2 | 1/2014 | Soni et al. | |
| 8,879,983 B2 | 11/2014 | Yun et al. | |
| 2001/0050987 A1 | 12/2001 | Yeap et al. | |
| 2002/0071508 A1 | 6/2002 | Takada et al. | |
| 2003/0027538 A1 | 2/2003 | Masumoto et al. | |
| 2003/0087622 A1 | 5/2003 | Jayaraman et al. | |
| 2003/0198200 A1 | 10/2003 | Diener et al. | |
| 2003/0224741 A1 | 12/2003 | Sugar et al. | |
| 2003/0236089 A1 | 12/2003 | Beyme et al. | |
| 2004/0028123 A1 | 2/2004 | Sugar et al. | |
| 2004/0146092 A1 | 7/2004 | Balakrishnan et al. | |
| 2004/0156440 A1 | 8/2004 | Sugar et al. | |
| 2004/0219885 A1 | 11/2004 | Sugar et al. | |
| 2004/0242174 A1 | 12/2004 | Kim et al. | |
| 2005/0163096 A1 * | 7/2005 | Momona | 370/349 |
| 2005/0163256 A1 | 7/2005 | Kroeger | |
| 2005/0233716 A1 | 10/2005 | Laroia et al. | |
| 2005/0250468 A1 | 11/2005 | Lu et al. | |
| 2005/0255878 A1 * | 11/2005 | Leinonen et al. | 455/552.1 |
| 2006/0045113 A1 | 3/2006 | Palisca | |
| 2006/0133551 A1 | 6/2006 | Davidoff et al. | |
| 2006/0146917 A1 | 7/2006 | Ishida | |
| 2006/0166681 A1 | 7/2006 | Lohbihler | |
| 2007/0002961 A1 | 1/2007 | Hoctor et al. | |
| 2007/0004355 A1 | 1/2007 | Kipnis et al. | |
| 2007/0019672 A1 * | 1/2007 | Guthrie | 370/466 |
| 2007/0027388 A1 * | 2/2007 | Chou | 600/393 |
| 2007/0030116 A1 | 2/2007 | Feher | |
| 2007/0053410 A1 | 3/2007 | Mahonen et al. | |
| 2007/0053412 A1 | 3/2007 | Hashimoto et al. | |
| 2007/0076649 A1 | 4/2007 | Lin et al. | |
| 2007/0110053 A1 | 5/2007 | Soni et al. | |
| 2007/0147236 A1 | 6/2007 | Lee | |
| 2007/0177570 A1 | 8/2007 | Kwon et al. | |
| 2007/0183547 A1 | 8/2007 | Fifield et al. | |
| 2007/0218870 A1 | 9/2007 | Satoh | |
| 2007/0242730 A1 | 10/2007 | Birru | |
| 2007/0279217 A1 | 12/2007 | Venkatraman et al. | |
| 2008/0043888 A1 | 2/2008 | Bhukania et al. | |
| 2008/0165894 A1 | 7/2008 | Kroeger | |
| 2008/0175331 A1 | 7/2008 | Kroeger | |
| 2008/0317098 A1 | 12/2008 | Juntunen | |
| 2009/0040107 A1 | 2/2009 | Yun et al. | |
| 2009/0042527 A1 | 2/2009 | Niknejad | |
| 2009/0054075 A1 | 2/2009 | Boejer et al. | |
| 2009/0075613 A1 | 3/2009 | Safarian et al. | |
| 2009/0080497 A1 * | 3/2009 | Wang et al. | 375/132 |
| 2009/0168843 A1 | 7/2009 | Waters et al. | |
| 2009/0198859 A1 | 8/2009 | Orishko et al. | |
| 2009/0286489 A1 | 11/2009 | Racherla et al. | |
| 2010/0099366 A1 | 4/2010 | Sugar et al. | |
| 2010/0111225 A1 | 5/2010 | Kroeger | |
| 2010/0137025 A1 | 6/2010 | Tal et al. | |
| 2010/0157882 A1 | 6/2010 | Moriwaki et al. | |
| 2010/0234044 A1 | 9/2010 | Lohbihler | |
| 2010/0284446 A1 | 11/2010 | Mu et al. | |
| 2010/0329247 A1 | 12/2010 | Kennedy et al. | |
| 2011/0122795 A1 | 5/2011 | Hwang et al. | |
| 2011/0130092 A1 | 6/2011 | Yun et al. | |
| 2014/0092771 A1 | 4/2014 | Siomina et al. | |

FOREIGN PATENT DOCUMENTS

| | | |
|---|---|---|
| JP | 2000-041277 A | 2/2000 |
| KR | 10-2007-0103980 A | 10/2007 |
| WO | WO 2004/107590 A1 | 12/2004 |
| WO | WO 2005/099132 A1 | 10/2005 |
| WO | WO 2006/084046 A2 | 8/2006 |
| WO | WO 2006/084046 A3 | 9/2007 |
| WO | WO 2008/009574 A1 | 1/2008 |
| WO | WO 2009/055714 A2 | 4/2009 |
| WO | WO 2009/055714 A3 | 7/2010 |

OTHER PUBLICATIONS

Berny, et al. A 1.8-GHz LC VCO with 1.3-GHz tuning range and digital amplitude calibration. IEEE Journal of Solid-State Circuits. Apr. 2005; 40:909-917.

(56) References Cited

OTHER PUBLICATIONS

Bevilacqua, et al. An ultra-wideband CMOS LNA for 3.1 to 10.6 GHz wireless receivers. IEEE Int. Solid-State Circuits Conf. Dig. Tech. Papers, 2004; 1:382-533.

Bruccoleri, et al. Wide-Band CMOS Low-Noise Amplifier Exploiting Thermal Noise Canceling. IEEE Journal of Solid-State Circuits. Feb. 2004; 39:275-282.

Chen, et al. A Highly Linear Broadband CMOS LNA Employing Noise and Distortion Cancellation. RFIC—Radio Frequency Integrated Circuits (RFIC) Symposium, 2007 IEEE. 2007: 61-64.

Chien, et al. A 900-MHz local oscillator using a DLL-based frequency multipliertechnique for PCS applications. Solid-State Circuits Conference, 2000. Digest of Technical Papers. ISSCC. 2000 IEEE International. Feb. 8, 2000. IEEE Journal of Solid State Circuits. 2000; 35(12):1996-1999.

Cook, et al. An ultra-low power 2.4GHz RF transceiver for wireless sensor networks in 0.13um CMOS with 400mV supply and an integrated passive RX front-end. Proc. IEEE International Solid-State Circuits Conference (ISSCC.06), vol. 49, Feb. 2006, pp. 370-371.

Favre, et al. A 2-V 600-æA 1-GHz BiCMOS Super-Regenerative Receiver for ISM Applications. IEEE J. Solid-State Circuits. 1998; 33(12):2186-2196.

Gesbert, et al. From Theory to practice: an overview of MIMO space-time coded wireless systems. IEEE J. Selected Areas in Communications. Apr. 2003; 21(3): 281-302.

Haldi, et al. A 5.8 GHz Linear Power Amplifier in a Standard 90nm CMOS Process using a 1 V Power Supply. RFIC—Radio Frequency Integrated Circuits (RFIC) Symposium, 2007 IEEE. 2007; 431-434.

International search report and written opinion dated Apr. 27, 2009 for PCT/US2008/081179.

International search report and written opinion dated Sep. 22, 2009 for PCT/US2009/033490.

Joehl, et al. A low-power 1-GHz super-regenerative transceiver with time-sharedPLL control. IEEE J. Solid-State Circuits. 2001; 36(7):1025-1031.

Liu, et al. A 1.2V, 2.4GHz fully integrated linear CMOS power amplifier with efficiency enhancement. Proceedings of CICC, 2006; p. 141-144.

O'Donnell, et al. An integrated, low power, ultra-wideband transceiver architecture for low-rate, indoor wireless system. Proc. IEEECAS Workshop on Wireless Communications and Networking, Pasadena, CA, Sep. 2002. (8 pages).

Otis, et al. A 400 µW-RX, 1.6mW-TX super-regenerative transceiver for wireless sensor networks. Proc. IEEE International Solid-State Circuits Conference. 2005; 48: 396-397, 606.

Poobuapheun, et al. A 1.5V 0.7-2.5GHz CMOS Quadrature Demodulator for Multi-Band Direct-Conversion Receivers. Proceedings of CICC. 2006:797-800.

Ray, et al. On noncoherent MIMO channels in the wideband regime: capacity and reliability. IEEE Trans. Inform. Teory. Jun. 2007; 53(6):1983-2009.

Rothman, et al. The Diagnosis of Cardiac Arrhythmias: A Prospective Multi-Center Randomized Study Comparing Mobile Cardiac Outpatient Telemetry Versus Standard Loop Event Monitoring. Journal of Cardiovascular Electrophysiology. 2007;18(3):241-247.

Shahani, et al. A 12mW Wide Dynamic Range CMOS Front-End for a Portable GPS Receiver. IEEE Journal of Solid-State Circuits. 1997; 32:2061-2070.

Vouilloz, et al. A low-power CMOS super-regenerative receiver at 1 GHz. IEEE J. Solid-State Circuits. 2001; 36(3):440-451.

Wang, et al. Circuit Modeling Methodology for UWB Omnidirectional Small Antennas. IEEE Journal on Selected Areas in Communications. 2006; 24:871-877.

Wang, et al. Design of a Sub-mW 960-MHz UWB CMOS LNA. IEEE Journal of Solid-State Circuits. 2006; 41:2449-2456.

Zheng, et al. Communication on the Grassman manifold: a geometric approach to the noncoherent multiple-antenna channel. IEEE Trans. Inform. Teory. Feb. 2002; 48(2):359-383.

UK combined search and examination report dated Jan. 24, 2012 for Application No. GB 1013574.7.

UK combined search and examination report dated Sep. 12, 2012 for Application No. GB 1215139.5.

Office action dated Apr. 5, 2011 for U.S. Appl. No. 12/138,394.
Office action dated Nov. 16, 2011 for U.S. Appl. No. 12/138,394.
Office action dated Nov. 16, 2011 for U.S. Appl. No. 12/138,398.
Office action dated Dec. 10, 2012 for U.S. Appl. No. 12/138,394.
Office action dated Dec. 16, 2013 for U.S. Appl. No. 12/866,189.
Office action dated Mar. 28, 2013 for U.S. Appl. No. 12/866,189.

\* cited by examiner

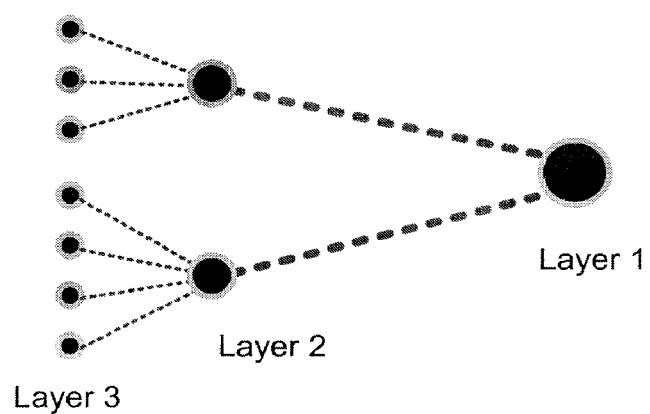

SYSTEMS AND NETWORKS FOR HALF AND FULL DUPLEX WIRELESS COMMUNICATION USING MULTIPLE RADIOS

CROSS-REFERENCE

This application claims the benefit of U.S. Provisional Application No. 60/982,242, filed Oct. 24, 2007, which application is incorporated herein by reference in its entirety.

BACKGROUND OF THE INVENTION

The appeal of a wireless communications device lies in its untethered nature. The lack of wires means that the power source for a portable device must be self-contained, so the device's power consumption directly impacts its operating life. Dual power radios exist with at least two communication devices where one communication device, the lower-powered device (LPD), can have a comparatively lower energy capacity than the other communication device, the higher-powered device (HPD). The communication from the LPD to the HPD is an uplink. The communication from the HPD to the LPD is the downlink. The invention can be used with systems where the uplink and downlink happens simultaneously. Additionally, the invention can be used when the uplink and the downlink can occur one direction at a time. In some embodiments, the system consists of a wireless system wherein the LPD has an ultrawideband radio transmitter and a narrowband receiver and the HPD has a NB radio transmitter and an ultrawideband receiver. Communication over the uplink takes place using ultrawideband transmissions, whereas communication over the downlink takes place using narrowband transmission. An ultrawideband radio can be made inexpensively with a transmitter that can consume very little power. The receiver can use a lot of power. A narrowband radio can be made such that the receiver can be made relatively power-efficient, whereas the transmitter consumes a lot of power.

It would therefore be desirable to have a wireless communications device that can: achieve very low power consumption which can extend the operating life of a wireless device; increase the reliability of communications on a wireless link; improve coexistence capability of the wireless communication system; and to accommodate any disparity in the transmission rate in each direction between any pair of communicating devices.

SUMMARY OF THE INVENTION

Provided herein is a wireless communication system comprising a first device and a second device. The first device comprises a first radio type and a second radio type. The second device comprises a first radio type and a second radio type. The first device is adaptable to form a communication link with the second device using the first radio or the second radio. The first device can be adaptable to transmit data to the second device through the first radio type or the second radio type. The second device can be adaptable to form a communication link with the first device through dynamic switching between the first radio type and second radio type of the second device. The second device can be adaptable to receive data from the first device through the first radio type or the second radio type. The second device can be adaptable to transmit data to the first device using the first radio type or the second radio type. The second device can be adaptable to be in communication with the first device through dynamic switching between the first radio type and the second radio type and the second device can be adaptable to transmit data to the first device through the first radio type or the second radio type. The first radio type can be a narrowband radio and the second radio type can be a wideband radio. The wireless system can be adaptable to monitor the quality of the communication link between the first device and the second device. The system can be further adaptable to dynamically switch between the first radio and the second radio in response to the quality of the communication link. The quality of the communication link can be determined by measuring the received radio signal strength. Alternatively, the quality of the communication link is determined by monitoring the background radio signal level. In some embodiments, the quality of the communication link is determined by monitoring the background interference and noise level. In some embodiments, the quality of the communication link can be determined by estimating the signal to noise ratio of the received radio signal. The quality of the communication link can also be determined by estimating the signal to interference and noise ratio of the received radio signal. Additionally, the system can be further adaptable to dynamically switch between the first radio and the second radio in response to the characteristics of the two radio types.

Further provided herein is a wireless communication system comprising a first application specific) integrated circuit adaptable to be coupled with a first radio type transmitter, and a second radio type receiver and a second application specific integrated circuit adaptable to be coupled with a first radio type receiver, and a second radio type transmitter. The system can be adaptable to dynamically switch between the first radio type and the second radio type to transmit data from a device employing the first application specific integrated circuit to a device employing the second application specific integrated circuit.

Further provided herein is a wireless communication system comprising a first application specific integrated circuit (ASIC) and a second application specific integrated circuit. The first ASIC comprises a first radio type transmitter, a second radio type transmitter, and a second radio type receiver. The second ASIC comprises a first radio type receiver, a second radio type receiver, and a second radio type transmitter. The system can be adaptable to dynamically switch between the first radio type and the second radio type to transmit data from a device employing the first application specific integrated circuit to a device employing the second application specific integrated circuit.

Provided herein is a wireless communication network comprising a plurality of devices comprising at least two devices, wherein at least two devices of the plurality of device are adaptable to form a communication link using a radio type selected from a plurality of radio types, wherein the network is adaptable to dynamically select the radio type used to form the communication link. The network can monitor the quality of the communication link between the at least two devices and is further adaptable to dynamically switch between the plurality of radio types in response to the quality of the communication link. The quality of the communication link can be determined by measuring the received radio signal strength. Alternatively, the quality of the communication link is determined by monitoring the background radio signal level. In some embodiments, the quality of the communication link is determined by monitoring the background interference and noise level. In some embodiments, the quality of the communication link can be determined by estimating the signal to noise ratio of the received radio signal. The quality of the communication link can be determined by estimating the signal to interference and noise ratio of the received radio signal. Additionally, the system can be further adaptable to dynamically switch between the first radio and the second radio in response to the characteristics of the two radio types. In some embodiments, the first radio type is a narrowband radio and the second radio type is an ultrawideband radio. The network can be further adaptable to select a radio channel adaptable to be used to form the communication link between the at least two devices. The channel can be selected randomly. Additionally, the network can be adaptable to maintain a database of radio channel availability.

Further provided herein is a wireless communication network comprising of a plurality of communication devices comprising at least two communication devices adaptable to form a communication link using a first radio type on the uplink and a second radio type on the downlink. The first radio type and second radio type can be selected based on the characteristics of the at least two communication devices. The first radio type can be a narrowband radio and the second radio type can be an ultrawideband radio. Additionally the network can be adaptable to dynamically select a radio channel for the at least two communication devices to communicate over.

Further provided herein is a wireless communication network comprising a plurality of devices and a channel multiplexer. The plurality of devices can comprise at least two devices. The two devices can be adaptable to form a communication link using a first radio type on the uplink and a second radio type on the downlink. The channel multiplexer can enable the communication link to coexist with an external network. In some embodiments, the plurality of device comprises more than two devices.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1 is illustrates a schematic drawing of a three-layer hierarchical network.

DETAILED DESCRIPTION OF THE INVENTION

Provided herein is a wireless communication system comprising a first device and a second device. The first device comprises a first radio type and a second radio type. The second device comprises a first radio type and a second radio type. The first device is adaptable to form a communication link with the second device using the first radio or the second radio. The first device can be adaptable to transmit data to the second device through the first radio type or the second radio type. The second device can be adaptable to form a communication link with the first device through dynamic switching between the first radio type and second radio type of the second device. The second device can be adaptable to receive data from the first device through the first radio type or the second radio type. The second device can be adaptable to transmit data to the first device using the first radio type or the second radio type. The second device can be adaptable to be in communication with the first device through dynamic switching between the first radio type and the second radio type and the second device can be adaptable to transmit data to the first device through the first radio type or the second radio type. The first radio type can be a narrowband radio and the second radio type can be a wideband radio. The wireless system can be adaptable to monitor the quality of the communication link between the first device and the second device. The system can be further adaptable to dynamically switch between the first radio and the second radio in response to the quality of the communication link. The quality of the communication link can be determined by measuring the received radio signal strength. Alternatively, the quality of the communication link is determined by monitoring the background radio signal level. In some embodiments, the quality of the communication link is determined by monitoring the background interference and noise level. In some embodiments, the quality of the communication link can be determined by estimating the signal to noise ratio of the received radio signal. The quality of the communication link can be determined by estimating the signal to interference and noise ratio of the received radio signal. Additionally, the system can be further adaptable to dynamically switch between the first radio and the second radio in response to the characteristics of the two radio types.

Further provided herein is a wireless communication system comprising a first application specific integrated circuit adaptable to be coupled with a first radio type transmitter, and a second radio type receiver and a second application specific integrated circuit adaptable to be coupled with a first radio type receiver, and a second radio type transmitter. The system can be adaptable to dynamically switch between the first radio type and the second radio type to transmit data from a device employing the first application specific integrated circuit to a device employing the second application specific integrated circuit.

Further provided herein is a wireless communication system comprising a first application specific integrated circuit (ASIC) and a second application specific integrated circuit. The first ASIC comprises a first radio type transmitter, a second radio type transmitter, and a second radio type receiver. The second ASIC comprises a first radio type receiver, a second radio type receiver, and a second radio type transmitter. The system can be adaptable to dynamically switch between the first radio type and the second radio type to transmit data from a device employing the first application specific integrated circuit to a device employing the second application specific integrated circuit.

Provided herein is a wireless communication network comprising a plurality of devices comprising at least two devices, wherein at least two devices of the plurality of devices are adaptable to form a communication link using a radio type selected from a plurality of radio types, wherein the network is adaptable to dynamically select the radio type used to form the communication link. The network can monitor the quality of the communication link between the at least two devices and is further adaptable to dynamically switch between the plurality of radio types in response to the quality of the communication link. The quality of the communication link can be determined by measuring the received radio signal strength. Alternatively, the quality of the communication link is determined by monitoring the background radio signal level. In some embodiments, the quality of the communication link is determined by monitoring the background interference and noise level. In some embodiments, the quality of the communication link can be determined by estimating the signal to noise ratio of the received radio signal. The quality of the communication link can be determined by estimating the signal to interference and noise ratio of the received radio signal. Additionally, the system can be further adaptable to dynamically switch between the first radio and the second radio in response to the characteristics of the two radio types. In some embodiments, the first radio type is a narrowband radio and the second radio type is an ultrawideband radio. The network can be further adaptable to select a radio channel adaptable to be used to form the communication link between the at least two devices. The channel can be selected randomly. Additionally, the network can be adaptable to maintain a database of radio channel availability.

Further provided herein is a wireless communication network comprising of a plurality of communication devices comprising at least two communication devices adaptable to form a communication link using a first radio type on the uplink and a second radio type on the downlink. The first radio type and second radio type can be selected based on the characteristics of the at least two communication devices. The first radio type can be a narrowband radio and the second radio type can be an ultrawideband radio. Additionally the network can be adaptable to dynamically select a radio channel for the at least two communication devices to communicate over. Further provided herein is a wireless communication network comprising a plurality of devices and a channel multiplexer. The plurality of devices can comprise at least two devices. The two devices can be adaptable to form a communication link using a first radio type on the uplink and a second radio type on the downlink. The channel multiplexer can enable the communication link to coexist with other external wireless networks.

I. Systems

The invention provided for herein comprises a wireless communication system consisting of two types of radios. The radios can be complementary radios, including for example, a narrowband (NB) radio and an ultrawideband (UWB) radio. A narrowband radio is any type of radio that is not an ultrawideband radio. The narrowband radio can have a channel bandwidth that is smaller than an ultrawideband radio channel bandwidth by an order of magnitude or more. Narrowband radios can be selected from Wi-Fi standard based radios, Bluetooth standard based radios, ZigBee standard based radios, MICS standard based radios, and WMTS standard based radio. Further provided herein is a wireless system consisting of two communication devices which can differ in their energy capacity. The invention provided herein can optimize the performance of the overall communication system by minimizing the total power consumption of the lower power device at the expense of higher power consumption of the high power device.

Further provided herein is a wireless communication system that can be adaptable to achieve a desired performance objective. For example purposes only, the performance objective can be to achieve very low power. The low power consumption can extend the operating life of the wireless device. Alternatively, the performance objective can be to increase the reliability of communications on a wireless link formed using the wireless device. In some embodiments the performance objective can be to improve the coexistence capability of the wireless communications system. In some embodiments, the performance objective can be to facilitate the transmission rate of data. The wireless communication system herein can accommodate a disparity in the transmission rate between any pair of communicating devices. Provided herein is a wireless communication system comprising at least two radios. The radios can be complementary radios; radios having different attributes (for example, power consumption, spectral efficiency, or implementation complexity) which complement each other. For example purposes only, a direct sequence spread spectrum (DS-SS) radio transmitter is relatively simple, but the corresponding receiver is complex and consumes relatively high power. A radio complementary to the DS-SS radio may be a radio that uses simple binary phase-shift keying (BPSK) modulation to minimize implementation complexity and power consumption. Another example of complementary radios can be a radio with an efficient transmitter implementation but less efficient receiver implementation, paired with a radio with an efficient receiver implementation but less efficient transmitter implementation.

The two radios of the wireless device can comprise a narrowband (NB) radio and an ultrawideband (UWB) radio. The narrowband radio, as used herein, can be a radio that is not an ultrawideband (UWB) radio. Alternatively, a NB radio can be characterized in terms of the UWB radio; the NB radio having a channel bandwidth that is smaller than the UWB radio channel bandwidth by an order of magnitude or more. Narrowband radios include, but are not limited to, Wi-Fi standard based radio, Bluetooth standard based radio, Zigbee standard based radio, MICS standard based radio, and WMTS standard based radio, or combinations thereof. The ultrawideband radio (UWB) can comprise multiple UWB channels. The UWB channels can be created by, for example purposes only, using direct sequence spreading codes, pulse positioning in time, or other multiplexing/demultiplexing means, or any combination thereof. Reservation-based and contention-based channel assignments are also possible for am UWB radio system.

The wireless system provided herein can be used for point-to-point systems. Additionally, the wireless device provided herein can be used for multiple access system. For example purposes only, NB radios employing multiple NB channels can be used with a multiple access system and other systems as well. The communication between devices can occur on a specified channel. The NB channel can be, for example, a frequency band, a timeslot, a combination of a frequency band and timeslot, frequency hopping sequence, direct-sequence spreading code, or other multiplexing/demultiplexing schemes, or combinations thereof. The assignment of a channel for a particular communication can be made by reservation or may be contention-based, for example using a Carrier Sense Multiple Access (CSMA) protocol. In some embodiments, the NB radio can be designed to be to transmit and receive on a single NB channel. Alternatively the NB radio can be capable of transmitting and receiving on multiple NB channels. NB radios capable of transmitting and receiving on multiple NB channels include, but are not limited to, radios employed in cellular base stations, for example, GSM.

The system provided herein can be used with devices that have different energy consumption requirements. In many practical systems, two devices communicating with each other over a wireless link can differ in the amount of energy required and available to them. For example, a cellular phone generally communicates with a base station. The base station is fixed in location and connected to the power grid, so it does not have the power limitations that a battery-powered cellular phone has. This difference in the amount of available energy is not limited to whether the device is portable or stationary. In medical telemetry, a wireless sensor device can be placed on the body of a patient to collect physiological data, and then wirelessly communicate the data to a SmartPhone. Both devices are portable and require self-contained power sources, but the sensor device may have a smaller form factor and be constrained to run on a smaller battery than the Smart-Phone. The sensor device can be designed to be disposable and supplied with a cheap, low capacity battery, whereas the SmartPhone can be a reusable device designed with a more expensive, higher capacity battery. In summary, there may be a disparity in the energy capacities of two devices communicating over a wireless link because of differences in their mobility (stationary versus portable), physical size, and cost.

The lowest power and lowest complexity radio transmitter in complementary metal-oxide-semiconductor (CMOS) technology is an UWB transmitter. Using the fast switching speeds of ultra-scaled very-large-scale integration (VLSI) technology, sub-nanosecond pulses are easily generated. A simple pulse generator, for instance, can be realized by utilizing an extra gate delay element in an XOR gate, where a sharp pulse is generated around the clock transitions. Such circuits can have rail-to-rail swing and can be used to drive a resonant load antenna, which is used to shape the pulse to meet the mask requirements. A simple gating scheme can be used to perform pulse position modulation or pulse density modulation. The power requirements to drive such gates can be relatively low, since CMOS technology is optimized for switching applications. The architecture is inherently compatible with CMOS technology. This can be contrasted with a traditional radiofrequency (RF) transmitter, which requires a power stage(s), driver stage(s), impedance matching, an LO and mixer, and modulator.

In some embodiments, the wireless communication system comprises two communicating devices which differ in their energy capacity. One communicating device, a low-powered device (LPD), can have a comparatively lower energy capacity and the other communicating device, a high-powered device (HPD), can have a comparatively higher energy capacity. The communication link from the LPD to the HPD is an uplink. The communication link from the HPD to the LPD is a downlink. The wireless communication system described herein can be applicable to full-duplex implementations, where communications on the uplink and the downlink can happen simultaneously. The wireless communication system can be applicable to half-duplex communications, where communications on the uplink and communications on the downlink only occur one direction at a time. In some embodiments, the LPD can have a binary phase-shift keying (BPSK) receiver and a direct sequence-spread spectrum (DS-SS) transmitter. The HPD can have a BPSK transmitter and a DS-SS receiver. Such a solution would be suitable for a radio system wherein relatively high rate data transmission occurs on the uplink, and the downlink is used primarily for relatively low rate control information transmission and data retransmission, in the event of errors. DS-SS allows for multiple devices to share common spectrum for uplink transmission, and packet-based CSMA may be used to share a common channel for BPSK downlink transmission.

In some embodiments, the wireless communication system can comprise a combination of a narrowband (NB) radio and an ultrawideband (UWB) radio. In some embodiments, the wireless device comprises a direct sequence spread spectrum (DS-SS) radio transmitter. The DS-SS transmitter can be relatively simple, but the corresponding receiver can be complex and consumes relatively high power. The DS-SS radio can be paired with a radio that uses simple binary phase-shift keying (BPSK) modulation to minimize implementation complexity and power consumption. Therefore, the wireless communication device can comprise an LPD to have a BPSK receiver and a DS-SS transmitter, and for the HPD to have a BPSK transmitter and a DS-SS receiver. High rate data transmission can occur over the uplink and lower rate control information transmission and data retransmission can occur over the downlink. The DS-SS radio can allow for multiple devices to share common spectrum for uplink transmission, and packet based CSMA can be used to share a common channel for BPSK downlink transmission.

In some embodiments, the wireless system comprises an LPD having a transmit-efficient (TE) (such as an UWB) radio transmitter radio transmitter and a radio-efficient (RE) (such as a NB) radio receiver and a HPD having an RE (such as a NB) radio transmitter and a TE (such as an UWB) radio receiver. Therefore, communication over the uplink can take place using UWB transmission, whereas communication over the downlink can take place using NB transmission. An UWB radio can have a transmitter which can be made inexpensively and which consumes very little power. The receiver can be power consuming, particularly if the center frequency is relatively high. A NB radio can have a receiver that can be made relatively power efficient and a receiver that can be power consuming. The wireless system described herein can optimize the overall communication system architecture to minimize the total power consumption of the LPD, at the expense of higher power consumption at the HPD. A radio architecture that is compatible with both a radio-efficient (RE) (such as a NB) communication system and also reconfigurable as a TE (such as an UWB) transceiver is described in U.S. Provisional Application Ser. No. 60/943,540, entitled "A Dual Mode UWB/Narrowband Reconfigurable Transceiver," which is incorporated by reference in its entirety.

In some embodiments, both the LPD and the HPD can each have a TE (such as an UWB) transmitter, a TE (such as an UWB) receiver, a radio-efficient (RE) (such as a NB) transmitter and a radio-efficient (RE) (such as a NB) receiver. The choice of which radio to use for the uplink and which radio to use for the downlink can be made by a method that takes into account the characteristics of the HPD and the LPD as well as the dynamic characteristics of the wireless propagation environment. In some embodiments, the wireless system can require implementation of more radio functionality and processing capability. By providing the freedom to select the best (and potentially different) radios to use for the downlink and the uplink individually offers higher communication reliability. Moreover, when a radio is not in use, it can be powered down, so as to avoid incurring a power penalty. For example purposed only, the initial radio choice for the system can be to use a TE (such as an UWB) radio for the uplink and radio-efficient (RE) (such as a NB) for the downlink. In this case, the TE (such as an UWB) receiver on the LPD and the TE (such as an UWB) transmitter on the HPD are powered down. While using the TE (such as an UWB) radio mode for the uplink, should the communication quality become unacceptable, the system can then dynamically switch to the use of the radio-efficient (RE) (such as a NB) radio for the uplink to maintain the quality of the communication.

While the radio-efficient (RE) (such as a NB) link is in use for the uplink, the TE (such as an UWB) link can be monitored. When the TE (such as an UWB) link is deemed to be of acceptable quality, the system can then switch back to using the TE (such as an UWB) radio. If the communication link quality of the downlink is poor, the system may switch to the use of TE (such as an UWB) for the downlink, with the option of switching back to radio-efficient (RE) (such as a NB) radio once the radio-efficient (RE) (such as a NB) radio link has recovered to acceptable quality. The communication quality can be assessed by the system on the basis of any suitable means for monitoring the system including, but not limited to, a signal quality estimator, a received signal strength indicator, estimated background interference and noise level, or any other suitable method for monitoring the system. The details of the method for determining when and how to switch between radios have been described in U.S. Provisional Application Ser. No. 60/894,174, filed Mar. 9, 2007, entitled "Wireless Communications System Using Multiple Radios," which is incorporated by reference in its entirety.

In some embodiments of the wireless device, the wireless device can comprise a LPD having a TE (such as an UWB) transmitter, a radio-efficient (RE) (such as a NB) transmitter and a radio-efficient (RE) (such as a NB) receiver, and the HPD comprises a TE (such as an UWB) receiver, a radio-efficient (RE) (such as a NB) receiver and an radio-efficient (RE) (such as a NB) transmitter.

In some embodiments, the wireless system can be used to form a communication link between devices wherein the switching of the radios can occur when it is desirable to have flexibility of switching between radios on the uplink for communication reliability, but to employ a single radio for the downlink so as to reduce costs. In some embodiments of the system, the system can have the flexibility of switching between radios on the downlink for communication reliability, but to employ a single radio for the uplink so as to reduce costs. In such an embodiment, the LPD can have a TE (such as an UWB) transmitter, a radio-efficient (RE) (such as a NB) receiver and a TE (such as an UWB) receiver. The HPD can also have a TE (such as an UWB) receiver, a radio-efficient (RE) (such as a NB) transmitter, and a TE (such as an UWB) transmitter.

The wireless communication network provided herein can comprise one or more application specific integrated circuits (ASICs). In some embodiments, the ASIC implements a superset of all the radio functionality, including the TE (such as an UWB) transmitter, the TE (such as an UWB) receiver, the radio-efficient (RE) (such as a NB) transmitter, and the radio-efficient (RE) (such as a NB) receiver. This superset ASIC can then be used in the different roles of LPD or HPD as mentioned previously, by powering on the different radio sections as needed. For example purposes only, if the superset ASIC is used as a LPD in the fourth embodiment, it would power off the radio-efficient (RE) (such as a NB) receiver radio section, but power on the TE (such as an UWB) transmitter, the radio-efficient (RE) (such as a NB) receiver and the TE (such as an UWB) receiver sections. Using an ASIC can offer economy of scale by being able to reuse a single ASIC for all the different possible roles for all possible embodiments. In an alternate approach, a custom ASIC can be built to optimize performance for silicon area, for each of the possible roles for each of the possible embodiments. Additionally, the approach has the advantage of even lower cost than the first approach if the manufacturing volume is high.

II. Networks

In some embodiments, the wireless system can be used to form a communication link between two wireless devices. In some embodiments, the wireless system can be applied to a network of wireless devices. For example, in a hub-and-spoke network topology, the hub node can be treated as a HPD and the spoke nodes may be treated as LPDs, relative to the hub. In this case, the realization of the first embodiment would be to equip each spoke node with a TE (such as an UWB) transmitter and a radio-efficient (RE) (such as a NB) receiver, and the hub node with a TE (such as an UWB) receiver and a radio-efficient (RE) (such as a NB) transmitter. In some embodiments, the hub can be the LPD and the spoke node can be the HPDs.

The two-device network and the hub-and-spoke network can be considered as special cases of a hierarchical network. In a hierarchical network, each node can be classified as belonging to a layer. A node can only communicate with nodes belonging in layers above and below the node's own layer. Optionally, some hierarchical networks allow node-to-node communication within the same layer. For example, shown in FIG. 1 is a 3-layer hierarchical network. Nodes in Layer 1 can communicate with nodes in Layer 2, and nodes in Layer 3 can communicate with nodes in Layer 2. Layer 2 nodes can communicate with Layer 1 nodes and Layer 3 nodes. The hierarchical organization of the network results in nodes in an upper layer communicating more information per node on average than nodes in a lower layer. This uneven distribution of data traffic is by design. Leaf nodes, or nodes at the bottom of the heirarchy, can be lower cost devices with potentially greater mobility and/or smaller form factor than the higher layer nodes. The leaf nodes can then be LPDs, whereas the upper layer nodes can be HPDs. For hierarchical networks, a combination of the different embodiments can be applied to achieve a performance objective. For example, in the network of FIG. 1, a leaf node in Layer 3 can have a TE (such as an UWB) transmitter and a radio-efficient (RE) (such as a NB) receiver. A Layer 2 node can have a TE (such as an UWB) transmitter, a radio-efficient (RE) (such as a NB) receiver, a TE (such as an UWB) receiver and a radio-efficient (RE) (such as a NB) transmitter, and only power-on the appropriate radio circuitry on an as-needed basis. For example, the node can power on the TE (such as an UWB) receiver or the radio-efficient (RE) (such as a NB) transmitter to receive from or transmit to, respectively a Layer 3 node. The node can power on the TE (such as an UWB) transmitter or the RE (such as a NB) receiver to transmit to or receive from, respectively, a Layer 1 node.

In some embodiments, the wireless network can comprise an arbitrary topology. With an arbitrary topology, the nodes of the network can classified as either hosts or switches. Hosts can be devices that are producers or consumers of information and that use the network to transport information between hosts. Switches can be the nodes in the network that are responsible for forwarding or relaying information between hosts. The hosts can be wireless and power limited, whereas the switches are less power constrained and can be wired devices. In this type of network, the hosts can be LPDs and the switches HPDs. Similarly with the hierarchical network description, a combination of the different embodiments can be applied. For example, the host LPD can have a TE (such as an UWB) transmitter and an radio-efficient (RE) (such as a NB) receiver only, or it can have a TE (such as an UWB) transmitter, a radio-efficient (RE) (such as a NB) transmitter and a radio-efficient (RE) (such as a NB) receiver in order to provide radio switching capability on the uplink. This combination can provide for higher reliability. The switch HPD can have a TE (such as an UWB) transmitter, a TE (such as an UWB) receiver, a radio-efficient (RE) (such as a NB) transmitter and a radio-efficient (RE) (such as a NB) receiver to provide radio switching capability on both the transmission and the reception of data for maximum reliability.

In a multiple access system, or other wireless system which employs multiple communication channels, a further inventive aspect of invention is to integrate the dynamic radio switching together with the selection radio channel selection. In other words, the radio can be selected and then a specific channel of the radio can be chosen based on availability. The partitioning of the radio spectrum into channels can be accomplished by different methods including, but not limited to, frequency band partitioning, the use of frequency hopping sequences, direct sequence spreading codes, pulse position offsets, pulse position hopping, or by any other suitable method for partitioning the radio spectrum.

For example purposes only, consider a TE (such as an UWB) radio being used for the uplink, where the communication quality is no longer acceptable. The communication quality can be assessed by the HPD TE (such as an UWB) receiver on the basis of various assessment methods including, but not limited to, a signal quality estimator, received signal strength indicator, estimated background interference and noise level, or some other performance objective as described in U.S. Provisional Application Ser. No. 60/894, 174, mentioned above, or any other suitable assessment method. When switching from TE (such as an UWB) radio mode to RE (such as NB) radio mode, a RE (such as NB) channel can be selected. In order to choose a channel, a database of channels can be maintained in which it is noted which channels are currently in use and which channels are available. The database can be centrally maintained and updated; for example, the database can be maintained and updated by a database server connected to the network. Each time a node needs to access the information in the database, the node can query the database server. Alternatively, the database can be distributed to the nodes. In such an embodiment, each node can maintains a local copy of the database, and any change to the database is broadcasted to all nodes in the network.

In some embodiments for selecting the channel as part of the radio switching process, a random available channel can be selected for the newly switched connection. In some embodiments, the HPD RE (such as NB) receiver monitors the background received signal levels on the RE (such as NB) channels. An available channel with the lowest background received signal level can then be selected for the newly switched connection. This approach can have the advantage that no pilot signals have to be transmitted from the LPD, therefore requiring less power consumption.

In some embodiments, the LPD RE (such as NB) transmitter can sends a pilot signal on each of the available NB channels. The HPD RE (such as NB) receiver can then receive the pilot signals on each of the available channels. The RE (such as NB) receiver can then use the pilot signal to estimate the potential signal quality on each of the available channels. The available channel with the highest signal quality can then selected for the newly switched connection. This approach can allow for a more accurate prediction of the communication quality on an available channel, but the use of pilot signals requires more complex processing and higher power consumption at both the HPD and LPD. In some embodiments, the partitioning of a radio spectrum into channels can be done using any suitable method for partitioning the radio spectrum including, but not limited to, frequency hopping sequences, direct sequence spreading codes, or pulse position hopping sequences. Channel selection can then consist of simply choosing a frequency hopping sequence, spreading code or pulse position hopping sequence not already in use. This approach can be particularly useful for systems coexisting with other wireless network systems that may not follow the same rules for channel selection as the wireless system of the present invention.

The wireless system can be used to enhance the coexistence capability of a wireless system (i.e., the ability of the system to perform its tasks in a shared environment without adversely impacting, or being impacted by, other wireless systems). For example purposes only, in medical telemetry, a hospital patient may be outfitted with a Personal Area Network (PAN) which is a wireless network of body sensors used to collect physiological data. The PAN of the patient may have to operate in the presence of the PANs of other patients. Additionally, the PAN of the patient may have to operate in the presence of other disparate wireless networks such as Bluetooth and Wi-Fi. Therefore, the coexistence capability of the wireless system can take into account other wireless systems which may or may not follow the same set of rules.

In some embodiments, the coexistence requirements can be met by using UWB and NB radios as the complementary radio pair. An UWB radio spreads its signal power over a wide band, and the total permissible power is generally low due to regulatory constraints. For example, the FCC limits the effective isotropic radiated power for a UWB radio to no more than −41.3 dBm/MHz, and less than −75.3 dBm/MHz in particularly congested bands. Since the vast majority of the energy of a UWB signal falls outside the bandwidth of a NB radio and therefore is filtered out, and since the residue in-band energy is low due to the FCC limit, a UWB signal has a relatively small interference impact on coexisting NB systems. This is in contrast to NB systems that can experience significant interference should their spectrum usage overlap with other radio frequencies. On the other hand, a UWB radio is sensitive to interference from NB systems. In particular, a single strong NB interferer may saturate the front end of a UWB receiver and severely disrupt communications. Therefore, a UWB system has the desirable property of low impact on the operation of other wireless systems (especially in environments where cooperative spectrum sharing is not guaranteed), but may be sensitive to the impact from coexisting NB systems. Thus, in systems which have both UWB and NB radios, it is preferable to use UWB as the primary mode, so as to minimize impact to other coexisting wireless systems, but also have to the ability to switch to the use of a NB radio. The switching from UWB to NB radio, together with channel multiplexing techniques previously mentions, can allow unimpeded operation of the wireless system in the presence of other systems which can generate strong interference.

In some embodiments, the wireless system does not have the option of switching between radios on the uplink and downlink, since the LPD only has a TE (such as an UWB) transmitter and a radio-efficient (RE) (such as a NB) receiver and the HPD only has a TE (such as an UWB) receiver and a radio-efficient (RE) (such as a NB) transmitter. Such a wireless system can coexist with other wireless systems by channel multiplexing. Different techniques for channel multiplexing include, but are not limited to, frequency hopping or frequency assignment, direct sequence spread spectrum, and pulse position hopping sequences or pulse position offset assignment. Using medical telemetry for example purposes only, the PAN of each patient can be assigned its own radio-efficient (RE) (such as a NB) frequency channel for the downlink and its own pulse position offset for TE (such as an UWB) transmission on the uplink. The assignment of channels can be based on channel measurements and the use of a centralized or distributed database of available channels, as described earlier for multiple access systems. Alternatively, the PAN of each patient can elect to do radio-efficient (RE) (such as a NB) radio frequency hopping on the downlink and direct sequence spreading or pulse position hopping for TE (such as an UWB) transmission on the uplink. This approach can have the disadvantage of communication outage whenever two wireless systems hop to the same frequency channel or pulse position simultaneously by chance, but the approach simplifies network planning and is particularly useful when the other coexisting wireless systems do not follow the same rules. The use of channel multiplexing techniques to improve coexistence with other wireless systems can be used with any embodiment of the invention. The use of frequency hopping, pulse position hopping, or direct sequence spreading can be advantageous for coexistence with wireless systems that follow a different set of rules.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A wireless communication system comprising
   a. a sensor comprising an ultrawideband (UWB) radio configured for transmission without being configured for reception and a narrowband (NB) radio configured for transmission and reception, the sensor configured to form a communication link with a second device using the UWB radio or the NB radio, the sensor configured to transmit data to the second device through the UWB radio configured for transmission without being configured for reception or the NB radio configured for transmission and reception; and
   b. the second device comprising an UWB radio configured for reception and a NB radio configured for transmission and reception, the second device configured to form a communication link with the sensor through dynamic switching between the UWB radio and NB radio, the second device configured to receive data from the sensor through the UWB radio configured for reception or the NB radio configured for transmission and reception, wherein the sensor has a comparatively lower energy capacity than the second device.

2. The system of claim 1 wherein the sensor is a wireless sensor device placed on a patient's body to collect physiological data.

3. The system of claim 1 wherein the second device is configured to transmit data to the sensor using the NB radio.

4. The system of claim 1 wherein the sensor is configured to be in communication with the second device through dynamic switching between the UWB radio and the NB radio, the sensor configured to transmit data to the second device through the UWB radio or the NB radio.

5. The system of claim 1 wherein the UWB radio has a channel bandwidth that is greater than the NB radio's channel bandwidth by an order of magnitude or more.

6. The system of claim 1 wherein the system is configured to monitor the quality of the communication link between the sensor and the second device and is further configured to dynamically switch between the UWB radio and the NB radio in response to the quality of the communication link.

7. The system of claim 6 wherein the quality of the communication link is determined by measuring the received radio signal strength.

8. The system of claim 6 wherein the quality of the communication link is determined by monitoring the background radio signal level.

9. The system of claim 6 wherein the quality of the communication link is determined by monitoring the background interference and noise level.

10. The system of claim 6 wherein the quality of the communication link is determined by estimating the signal to noise ratio of the received radio signal.

11. The system of claim 6 wherein the quality of the communication link is determined by estimating the signal to interference and noise ratio of the received radio signal.

12. The system of claim 6 wherein the system is further configured to dynamically switch between the UWB radio and the NB radio in response to the characteristics of the UWB radio and the NB radio.

13. A wireless communication system comprising:
   a. a sensor having a first application specific integrated circuit adaptable to be coupled with an ultrawideband (UWB) radio configured for transmission and not configured for reception, and a narrowband (NB) radio configured for reception and transmission; and
   b. a device having a second application specific integrated circuit configured to be coupled with a UWB radio capable of reception of data from the UWB radio of the sensor, and a NB radio configured for reception and transmission of data with the NB radio of the sensor, wherein the sensor has a lower capacity battery than the device which has a higher capacity battery.

14. The system of claim 13 wherein the system is configured to dynamically switch between the UWB radio and the NB radio to transmit data from the sensor employing the first application specific integrated circuit to the device employing the second application specific integrated circuit.

15. The system of claim 13 wherein the UWB radio has a channel bandwidth that is greater than the NB radio's channel bandwidth by an order of magnitude or more.

16. The system of claim 14 wherein the UWB radio and the NB radio are dynamically switched to reduce the total power consumption of the sensor at the expense of the device.

17. A wireless communication network comprising
   a plurality of devices comprising at least two devices, wherein at least two devices of the plurality of device are configured to form a communication link using an ultrawideband (UWB) radio type on the uplink and narrowband (NB) radio type on the downlink, wherein the UWB radio type and the NB radio type are simultaneously available on each of the at least two devices,
   wherein at least one of the devices of said plurality is a sensor placed on the body of a patient to collect physiological data, wherein (1) the sensor is configured only for transmission through an UWB radio, and is configured for both transmission and reception through a NB radio, and (2) another device of said plurality is configured for reception through an UWB radio, and is configured for both transmission and reception though a NB radio,
   wherein the UWB radio type forms a communication link that provides a lower total power consumption of the sensor while providing an increased power consumption of the other device of said plurality of device compared to the NB radio type;
   wherein the network is configured to dynamically select a radio between the UWB radio type and the NB radio type, and use the selected radio to form the communication link that minimizes the total power consumption of the sensor at the expense of higher power consumption of the other device of said plurality of devices while obtaining an acceptable quality of the communication link.

18. The network of claim 17 wherein the network is configured to monitor the quality of the communication link between the at least two devices and is further configured to dynamically switch between the UWB radio type and the NB radio type in response to the quality of the communication link.

19. The network of claim 18 wherein the quality of the communication link is determined by measuring the received radio signal strength.

20. The network of claim 18 wherein the quality of the communication link is determined by monitoring the background signal level.

21. The network of claim 18 wherein the quality of the communication link is determined by estimating the signal to noise ratio of the received radio signal.

22. The network of claim 18 wherein the quality of the communication link is determined by estimating the signal to interference and noise ratio of the received radio signal.

23. The network of claim 18 wherein the network is further configured to dynamically switch between the UWB radio and the NB radio in response to the characteristics of the UWB radio type and the NB radio type.

24. The network of claim 18 wherein the network is further configured to select a radio channel configured to be used to form the communication link between the at least two devices.

25. The network of claim 24 wherein the network is configured to maintain a database of radio channel availability.

26. The network of claim 25 wherein the channel to be selected is configured to be selected randomly.

27. A wireless communication network comprising of a plurality of communication devices comprising at least two communication devices configured to form a communication link using an ultrawideband (UWB) radio type on the uplink and a narrowband (NB) radio type on the downlink, wherein at least one of the devices is a sensor forming a communication link with another device,
wherein the sensor is configured only for transmission through an UWB radio, and is configured for both transmission and reception through a NB radio,
wherein the other device is configured for reception through an UWB radio, and is configured for both transmission and reception through a NB radio, and
wherein the network is configured to dynamically select the radio type between the UWB radio type and the NB radio type that forms the communication link that minimizes the total power consumption of the sensor at the expense of higher power consumption of the other device.

28. The network of claim 27 wherein the UWB radio type and NB radio type are configured to be selected based on the characteristics of the at least two communication devices.

29. The network of claim 27 further comprising:
a channel multiplexer configured to enable the communication link to coexist with an external network.

30. The system of claim 6 wherein sensor is configured to communicate with the second device using the UWB radio and dynamically switch to the use of the NB radio to receive the data reception acknowledgement from the second device.

31. The system of claim 30 wherein the UWB radio's link is monitored while the UWB radio is used, and the use is dynamically switched to the use of the NB radio if the quality using the UWB radio becomes unacceptable.

32. The system of claim 31 wherein the UWB radio's link is monitored while the NB radio is used, and use is switched back to the UWB radio when the UWB radio's link is determined to be of acceptable quality.

* * * * *